(12) United States Patent
Jost et al.

(10) Patent No.: US 12,513,521 B2
(45) Date of Patent: Dec. 30, 2025

(54) AUTHENTICATION AND AUTHORIZATION OF SERVERS AND CLIENTS IN EDGE COMPUTING

(71) Applicant: Telefonaktiebolaget LM Ericsson (publ), Stockholm (SE)

(72) Inventors: Christine Jost, Dalby (SE); Ferhat Karakoc, Istanbul (TR); Stefan Håkansson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 324 days.

(21) Appl. No.: 18/546,874

(22) PCT Filed: Feb. 16, 2022

(86) PCT No.: PCT/EP2022/053824
§ 371 (c)(1),
(2) Date: Aug. 17, 2023

(87) PCT Pub. No.: WO2022/175329
PCT Pub. Date: Aug. 25, 2022

(65) Prior Publication Data
US 2024/0137765 A1 Apr. 25, 2024
US 2024/0236676 A9 Jul. 11, 2024

Related U.S. Application Data

(60) Provisional application No. 63/151,916, filed on Feb. 22, 2021.

(51) Int. Cl.
*H04W 12/069* (2021.01)
*H04L 9/40* (2022.01)
*H04W 12/71* (2021.01)

(52) U.S. Cl.
CPC ....... *H04W 12/069* (2021.01); *H04L 63/0807* (2013.01); *H04L 63/0823* (2013.01);
(Continued)

(58) Field of Classification Search
CPC ..... H04W 12/069; H04W 12/71; H04W 4/50; H04W 12/068; H04W 12/084;
(Continued)

(56) References Cited

U.S. PATENT DOCUMENTS 9,825,936 B2 * 11/2017 Koster ................ H04L 63/0815
11,558,189 B2 * 1/2023 Garcia Valenzuela ......................
H04L 63/10
(Continued)

FOREIGN PATENT DOCUMENTS

CN 102739687 A 10/2012
CN 103237038 A 8/2013
(Continued)

OTHER PUBLICATIONS

"3GPP TR 23.748 V17.0.0", 3rd Generation Partnership Project; Technical Specification Group Services and System Aspects; Study on enhancement of support for Edge Computing in 5G Core network (5GC) (Release 17), Dec. 2020, pp. 1-250.
(Continued)

*Primary Examiner* — Mahendra R Patel
(74) *Attorney, Agent, or Firm* — Murphy, Bilak & Homiller, PLLC

(57) ABSTRACT

Embodiments include methods performed by a client in an edge data network. Such methods include obtaining an initial access token before accessing the edge data network. The initial access token is based on an identifier of the client. Such methods include establishing a first connection with a server of the edge data network based on transport layer security (TLS) and authenticating the server based on a
(Continued)

server certificate received from the server via the first connection. Such methods include providing the initial access token to the server, via the first connection, for authentication of the client. Other embodiments include complementary methods performed by a server in an edge data network, as well as apparatus (e.g., user equipment and servers) configured to perform such methods.

18 Claims, 13 Drawing Sheets

(52) U.S. Cl.
CPC ........ *H04L 63/0876* (2013.01); *H04L 63/166* (2013.01); *H04W 12/71* (2021.01)

(58) Field of Classification Search
CPC ............... H04W 12/69; H04L 63/0807; H04L 63/0823; H04L 63/0876; H04L 63/166
USPC ........................................................ 455/411
See application file for complete search history.

(56) References Cited

U.S. PATENT DOCUMENTS

| | | | | |
|---|---|---|---|---|
| 11,622,255 | B2* | 4/2023 | Iddya | H04W 8/06 455/433 |
| 2004/0225878 | A1* | 11/2004 | Costa-Requena | H04L 63/08 713/150 |
| 2008/0127320 | A1* | 5/2008 | De Lutiis | H04L 61/5084 726/9 |
| 2013/0212663 | A1* | 8/2013 | Edge | H04W 4/029 726/7 |
| 2014/0259109 | A1 | 9/2014 | Houston et al. | |
| 2016/0012465 | A1* | 1/2016 | Sharp | G06Q 20/321 705/14.17 |
| 2017/0257363 | A1* | 9/2017 | Franke | H04W 12/069 |
| 2018/0278602 | A1 | 9/2018 | Koushik et al. | |
| 2019/0026450 | A1* | 1/2019 | Egner | G06F 21/44 |
| 2019/0281460 | A1* | 9/2019 | Yin | H04L 9/0866 |
| 2020/0004946 | A1* | 1/2020 | Gilpin | H04L 9/50 |
| 2020/0021586 | A1* | 1/2020 | Schmidt | H04L 63/20 |
| 2020/0359218 | A1* | 11/2020 | Lee | H04W 12/63 |
| 2021/0352113 | A1 | 11/2021 | Sodagar | |
| 2021/0392112 | A1* | 12/2021 | Nagrockas | H04L 9/30 |
| 2022/0312206 | A1* | 9/2022 | Gou | H04W 12/068 |
| 2025/0227099 | A1* | 7/2025 | Jost | H04L 63/08 |

FOREIGN PATENT DOCUMENTS

| | | | | |
|---|---|---|---|---|
| CN | 109033789 A | * | 12/2018 | ............. G06F 21/33 |
| WO | WO-2007008976 A1 | * | 1/2007 | ............. H04L 63/08 |

OTHER PUBLICATIONS

"3GPP TR 33.839 V0.4.0", 3rd Generation Partnership Project; Technical Specification Group Services and System Aspects; Study on Security Aspects of Enhancement of Support for Edge Computing in 5GC (Release 17), Jan. 2021, pp. 1-56.
"3GPP TR 33.839 V0.7.0", 3rd Generation Partnership Project; Technical Specification Group Services and System Aspects; Study on Security Aspects of Enhancement of Support for Edge Computing in 5GC (Release 17), Aug. 2021, pp. 1-76.
"3GPP TS 23.003 V17.3.0", 3rd Generation Partnership Project; Technical Specification Group Core Network and Terminals; Numbering, addressing and identification; (Release 17), Sep. 2021, pp. 1-145.
"3GPP TS 23.501 V17.2.0", 3rd Generation Partnership Project; Technical Specification Group Services and System Aspects; System architecture for the 5G System (5GS); Stage 2 (Release 17), Sep. 2021, pp. 1-542.
"3GPP TS 23.558 V1.3.0", 3rd Generation Partnership Project; Technical Specification Group Services and System Aspects; Architecture for enabling Edge Applications; (Release 17), Jan. 2021, pp. 1-134.
"3GPP TS 23.558 V17.1.0", 3rd Generation Partnership Project; Technical Specification Group Services and System Aspects; Architecture for enabling Edge Applications; (Release 17), Sep. 2021, pp. 1-162.
"3GPP TS 33.210 V16.4.0", 3rd Generation Partnership Project; Technical Specification Group Services and System Aspects;Network Domain Security (NDS); IP network layer security (Release 16), Jul. 2020, pp. 1-27.
"3GPP TS 33.310 V16.6.0", 3rd Generation Partnership Project; Technical Specification Group Services and System Aspects; Network Domain Security (NDS); Authentication Framework (AF) (Release 16), Dec. 2020, pp. 1-59.
"3GPP TS 33.501 V17.3.0", 3rd Generation Partnership Project; Technical Specification Group Services and System Aspects; Security architecture and procedures for 5G system (Release 17), Sep. 2021, pp. 1-258.
"3GPP TS 33.535 V16.0.0", 3rd Generation Partnership Project; Technical Specification Group Services and System Aspects; Authentication and Key Management for Applications (AKMA) based on 3GPP credentials in the 5G System (5GS) (Release 16), Jul. 2020, pp. 1-18.
"3GPP TS 33.535 V16.1.0", 3rd Generation Partnership Project; Technical Specification Group Services and System Aspects; Authentication and Key Management for applications (AKMA) based on 3GPP credentials in the 5G System (5GS) (Release 16), Sep. 2020, pp. 1-19.
"3GPP TS 33.535 V16.2.0", 3rd Generation Partnership Project; Technical Specification Group Services and System Aspects; Authentication and Key Management for Applications (AKMA) based on 3GPP credentials in the 5G System (5GS) (Release 16), Dec. 2020, pp. 1-20.
"3GPP TS 33.535 V17.3.0", 3rd Generation Partnership Project; Technical Specification Group Services and System Aspects; Authentication and Key Management for Applications (AKMA) based on 3GPP credentials in the 5G System (5GS) (Release 17), Sep. 2021, pp. 1-24.
"3GPP TS 33.558 V0.1.0", 3rd Generation Partnership Project; Technical Specification Group Services and System Aspects; Security aspects of enhancement of support for enabling edge applications; Stage 2 (Release 17), Aug. 2021, pp. 1-12.
"EC: Authentication and Authorization between EEC and ECS", 3GPP TSG-SA3 Meeting #104e-Ad-hoc, S3-213443, e-meeting, Online, Sep. 27-30, 2021, pp. 1-3.
"EC: Authentication and Authorization between EEC and EES", 3GPP TSG-SA3 Meeting #104e-Ad-hoc, S3-213444, e-meeting, Online, Sep. 27-30, 2021, pp. 1-3.
"Proposed text for normative: Authentication and authorization between EEC and ECS", 3GPP TSG-SA3 Meeting #104-e ad-hoc, S3-213504, e-meeting, Revision of S3-20xxxx, Sep. 27-30, 2021, pp. 1-3.
"Proposed text for normative: Authentication and authorization between EEC and EES", 3GPP TSG-SA3 Meeting #104-e ad-hoc, S3-213505, e-meeting, Revision of S3-20xxxx, Sep. 27-30, 2021, pp. 1-2.
"Token-based solution for EEC authentication", 3GPP TSG-SA3 Meeting #104-e ad-hoc, S3-213484, e-meeting, Revision of S3-20xxxx, Sep. 27-30, 2021, pp. 1-4.
"3GPP TS 23.003 V16.5.0", 3rd Generation Partnership Project; Technical Specification Group Core Network and Terminals; Numbering, addressing and identification; (Release 16), Dec. 2020, pp. 1-142.
"3GPP TS 33.501 V16.0.0", 3rd Generation Partnership Project; Technical Specification Group Services and System Aspects; Security architecture and procedures for 5G system (Release 16), Sep. 2019, pp. 1-196.
"3GPP TS 38.401 V15.6.0", 3rd Generation Partnership Project; Technical Specification Group Radio Access Network; NG-RAN; Architecture description (Release 15), Jul. 2019, pp. 1-46.

(56) References Cited

OTHER PUBLICATIONS

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.

"3GPP TS 33.501 V16.4.0", 3rd Generation Partnership Project; Technical Specification Group Services and System Aspects; Security architecture and procedures for 5G system (Release 16), Sep. 2020, pp. 1-250.

"3GPP TS 33.501 V17.0.0", 3rd Generation Partnership Project; Technical Specification Group Services and System Aspects; Security architecture and procedures for 5G system (Release 17), Dec. 2020, pp. 1-253.

"3GPP TS 23.501 V16.7.0", 3rd Generation Partnership Project; Technical Specification Group Services and System Aspects; System architecture for the 5G System (5GS); Stage 2 (Release 16), Dec. 2020, pp. 1-450.

"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.

Menezes, A., et al., "Chapter 13: Key Management Techniques", Handbook of Applied Cryptography, Oct. 1996, pp. 1-49.

"EC: Update to solution #17", 3GPP TSG-SA3 Meeting #102Bis-e, S2-211114, e-meeting, Mar. 1-5, 2021, pp. 1-7.

\* cited by examiner

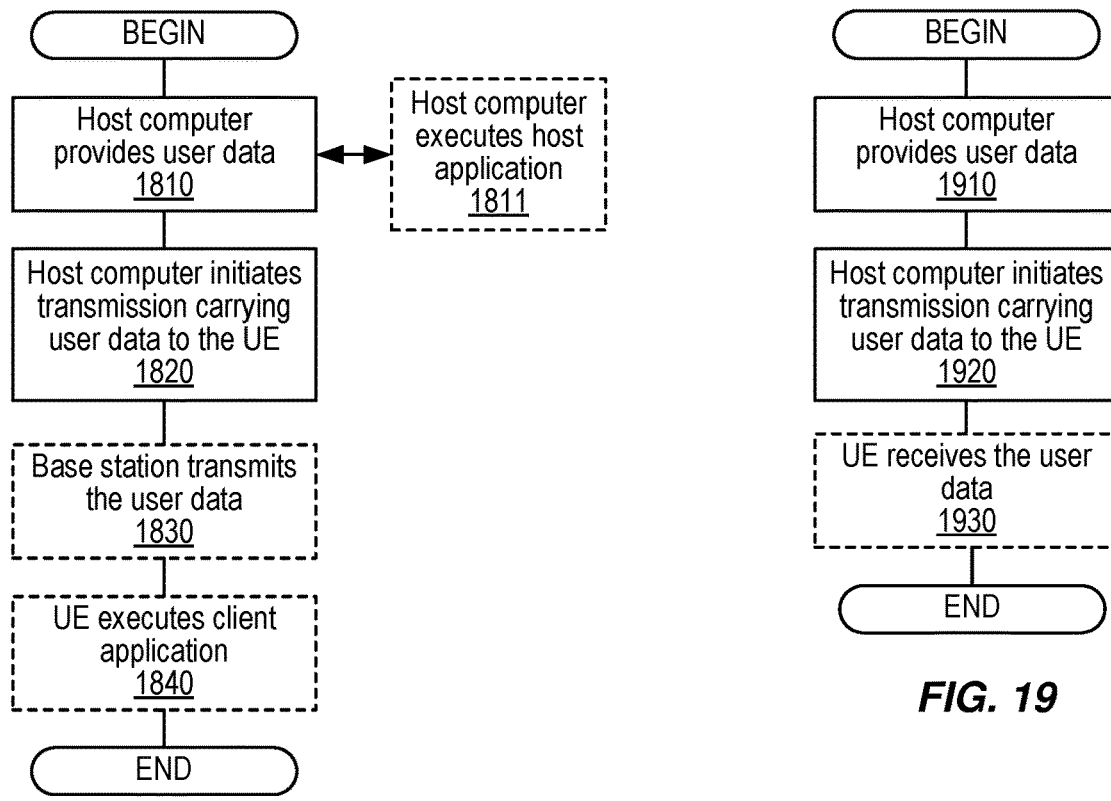
FIG. 18
FIG. 19
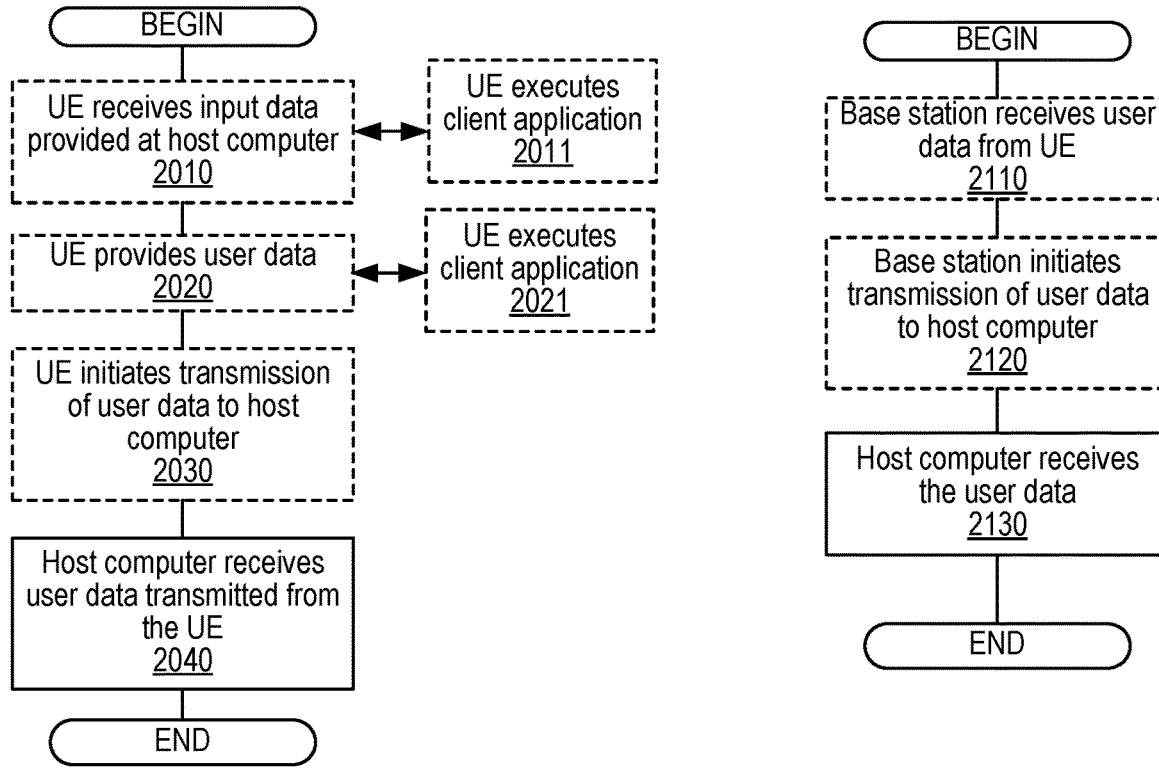
FIG. 20
FIG. 21

AUTHENTICATION AND AUTHORIZATION OF SERVERS AND CLIENTS IN EDGE COMPUTING

TECHNICAL FIELD

The present application relates generally to the field of wireless communication networks, and more specifically to "edge computing" techniques that facilitate execution environments proximate to users and/or devices that provide and consume data, rather than in centralized, public network clouds.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates a high-level view of an exemplary 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," with the term "AMF" being discussed in more detail below.

The NG-RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services. This SBA model also adopts principles like modularity, reusability, and self-containment of NFs, which can enable deployments to take advantage of the latest virtualization and software technologies.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

3GPP Rel-16 introduced a feature called authentication and key management for applications (AKMA) that is based on 3GPP user credentials in 5G, including the Internet of Things (IoT) use case. More specifically, AKMA leverages the user's AKA (Authentication and Key Agreement) credentials to bootstrap security between the UE and an application function (AF), which allows the UE to securely exchange data with an application server. The AKMA architecture can be considered an evolution of GBA (Generic Bootstrapping Architecture) specified for 5GC in 3GPP Rel-15 and is further specified in 3GPP TS 33.535 (v16.0.0).

It is expected that 5GC will support edge computing (EC), which enables operator and third-party services to be hosted close to a UE's access point of attachment. This can facilitate efficient service delivery through the reduced end-to-end latency and load on the transport network. The 5GC can select a user plane function (UPF) close to the UE and executes the traffic steering from the UPF to the local data network via an N6 interface. Both UPF and N6 are discussed in more detail below.

3GPP TR 23.748 (v17.0.0) discusses architectural enhancements that may be needed to support EC in 5GC for 3GPP Rel-17. In addition, 3GPP TR 33.839 (v0.4.0) discusses a study on security aspects of enhancement of support for EC in 5GC for 3GPP Rel-17. Key issues discussed in 3GPP TR 33.839 include authentication, authorization, and transport security solutions for interfaces between clients and servers and for interfaces between different servers in an Edge data network. These servers can include Edge Configuration Servers (ECS), Edge Enabler Servers (EES), and Edge Application Servers (EAS). Relevant clients include Edge Enabler Client (EEC), which is a UE-based application that communicates with ECS and EES.

SUMMARY

However, current solutions for EEC authentication—such as AKMA and transport layer security (TLS)— have various difficulties, issues, and/or drawbacks that make them unsuitable for use over interfaces between EEC and various servers (e.g., ECS and/or EES). Accordingly, embodiments of the present disclosure address these and other problems, issues, and/or difficulties related to security, thereby enabling the otherwise-advantageous deployment of EC solutions in relation to a 5G network.

Some embodiments of the present disclosure include methods (e.g., procedures) for a client (e.g., EEC or UE hosting the same) in an edge data network (e.g., 5G network).

These exemplary methods can include obtaining an initial access token before accessing the edge data network. The initial access token is based on an identifier of the client. These exemplary methods can also include establishing a first connection with a server of the edge data network based on transport layer security (TLS). These exemplary methods can also include authenticating the server based on a server certificate received from the server via the first connection. These exemplary methods can also include providing the initial access token to the server, via the first connection, for authentication of the client.

In some embodiments, these exemplary methods can also include subsequently receiving a second access token from the server via the first connection. The second access token is also based on the identifier of the client.

In some of these embodiments, these exemplary methods can also include subsequently establishing a second connection with the server based on TLS; authenticating the server based on a server certificate received from the server via the second connection; and providing the second access token to the server, via the second connection, for authentication of the client. In some variants, these exemplary methods can also include subsequently receiving a third access token from the server via the second connection. The third access token is also based on the identifier of the client.

In some embodiments, the first connection is associated with an IP address and the client is hosted by a UE that is associated with a UE identifier. In such embodiments, these exemplary methods can also include providing the UE identifier to the server, via the first connection, for authentication of the UE.

In some embodiments, the client is an EEC and the server is an ECS or an EES. In some of these embodiments, the initial access token can be obtained from an edge computing service provider (ECSP) that is associated with the EEC. In other of these embodiments, the server is an EES and the initial access token is obtained from an ECS.

Other embodiments include complementary methods (e.g., procedures) for a server (e.g., ECS, EES) in an edge data network (e.g., 5G network).

These exemplary methods can include establishing a first connection with a client of the edge data network based on TLS. These exemplary methods can also include providing a server certificate to the client, via the first connection, for authentication of the server. These exemplary methods can also include authenticating the client based on an initial access token received from the client via the first connection. The initial access token is based on an identifier of the client.

In some embodiments, these exemplary methods can also include, after authenticating the client based on the initial access token, sending a second access token to the client via the first connection. The second access token is also based on the identifier of the client.

In some of these embodiments, these exemplary methods can also include the following: subsequently establishing a second connection with the client based on TLS; providing the server certificate to the client, via the second connection, for authentication of the server; and authenticating the client based on the second access token received from the client via the second connection.

In some of these embodiments, these exemplary methods can also include, after authenticating the client based on the second access token, selectively sending a third access token to the client via the second connection. The third access token is also based on the identifier of the client. In some embodiments, selectively sending can include comparing a duration of validity of the second access token to a predetermined threshold; sending the third access token when the duration of validity is less than the predetermined threshold; and refraining from sending the third access token when the duration of validity is not less than the predetermined threshold.

In some embodiments, the client is hosted by a UE that is associated with a UE identifier. In such embodiments, these exemplary methods can also include authenticating the UE based on the UE identifier, which is received from the UE via the first connection. In some of these embodiments, the first connection is associated with an IP address and authenticating the UE can include comparing the IP address to a source IP address of the UE identifier and authenticating the UE when the IP address matches the source IP address.

In some embodiments, the client is an EEC and the server is an ECS or an EES.

In some of these embodiments, the server is an EES and the initial access token is obtained from an ECS. In other of these embodiments, the initial access token can be associated with an ECSP that is associated with the EEC. In such embodiments, the authenticating the client can include performing a verification procedure with the ECSP for the initial access token.

Other embodiments include clients (or UEs hosting the same) and servers (or network nodes hosting the same) of an edge data network that are configured to perform the operations corresponding to any of the exemplary methods described herein. Other embodiments also include non-transitory, computer-readable media storing computer-executable instructions that, when executed by processing circuitry, configure such clients and servers to perform operations corresponding to any of the exemplary methods described herein.

These and other embodiments described herein can facilitate authentication of both the client identity (e.g., EEC ID) and UE identity (e.g., UE ID) at the same time with a proof that the EEC identified by the EEC ID is running on the UE identified by the UE ID. This can facilitate secure deployment of edge computing within 5G networks.

These and other objects, features, and advantages of the present disclosure will become apparent upon reading the following Detailed Description in view of the Drawings briefly described below.

BRIEF DESCRIPTION OF THE DRAWINGS

FIGS. 18-21 are flow diagrams of exemplary methods (e.g., procedures) for transmission and/or reception of user data, according to various embodiments of the present disclosure.

DETAILED DESCRIPTION

Figure 1:
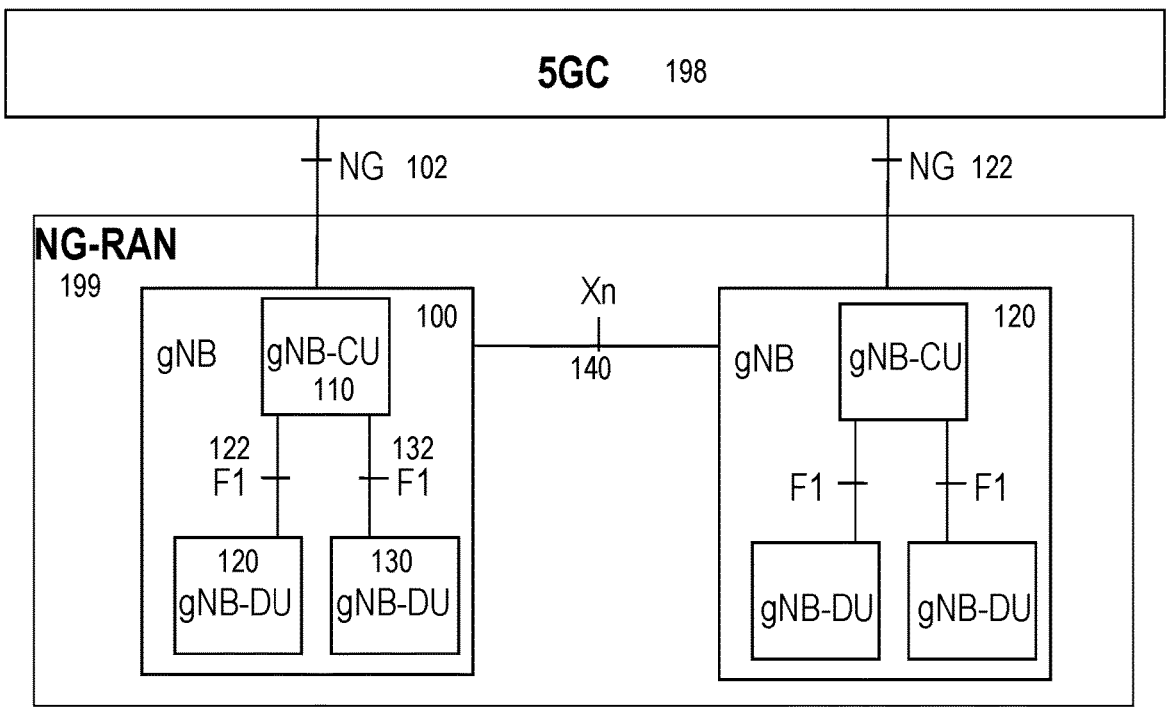
FIGS. 1-2 illustrate various aspects of an exemplary 5G network architecture.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Service: As used herein, the term "service" refers generally to a set of data, associated with one or more applications, that is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, current solutions for Edge Enabler Client (EEC) authentication—such as AKMA and transport layer security (TLS)— have various difficulties, issues, and/or drawbacks that make them unsuitable for use over interfaces between EEC and various servers (e.g., ECS and/or EES) in the proposed Edge network for the 5GS. This can create various problems, difficulties, and/or issues for deployment of EC solutions, which is discussed in more detail after the following description of 5G network and security architectures.

Figure 2:
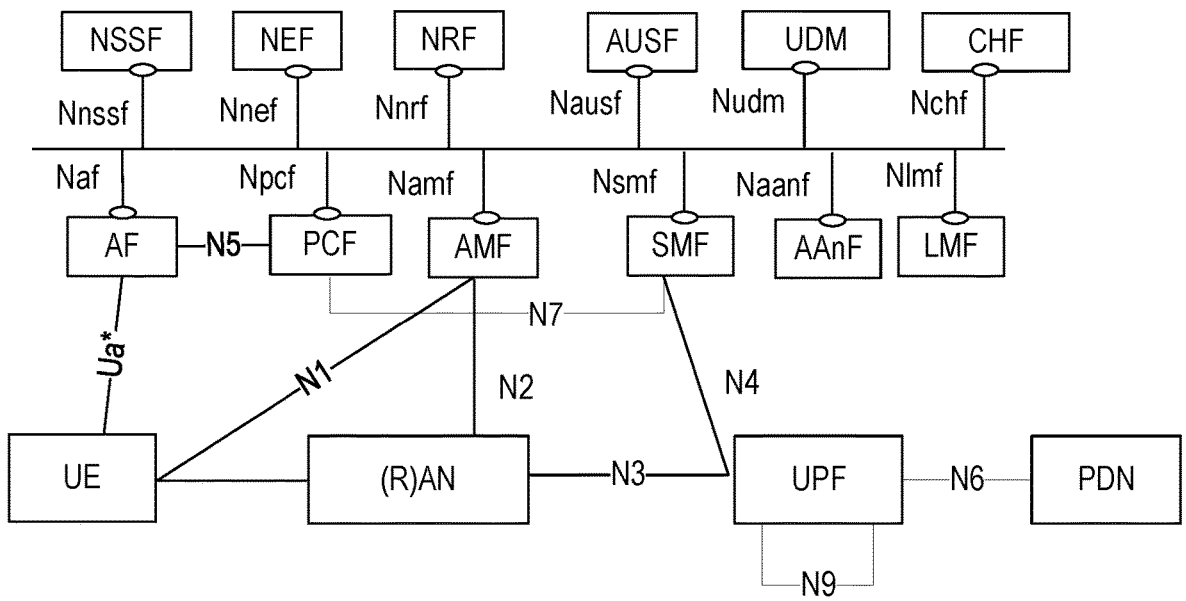

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)— supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface— acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

3GPP Rel-16 introduces a new feature called authentication and key management for applications (AKMA) that is based on 3GPP user credentials in 5G, including the Internet of Things (IoT) use case. More specifically, AKMA leverages the user's AKA (Authentication and Key Agreement) credentials to bootstrap security between the UE and an application function (AF), which allows the UE to securely exchange data with an application server. The AKMA architecture is an evolution of Generic Bootstrapping Architecture (GBA) specified for 5GC in 3GPP Rel-15 and is further specified in 3GPP TS 33.535 (v16.2.0).

In addition to the NEF, AUSF, and AF shown in FIG. 2 and described above, Rel-16 AKMA also utilizes an anchor function for authentication and key management for applications (AAnF). This function is shown in FIG. 2 with Naanf interface. In general, AAnF interacts with AUSFs and maintains UE AKMA contexts to be used for subsequent bootstrapping requests, e.g., by application functions. At a high level, AAnF is similar to a bootstrapping server function (BSF) defined for Rel-15 GBA.

In general, security mechanisms for various 5GS protocols rely on multiple security keys. 3GPP TS 33.501 (v17.0.0) specifies these keys in an organized hierarchy. At the top is the long-term key part of the authentication credential and stored in the SIM card on the UE side and in the UDM/ARPF in the user's HPLMN.

A successful Primary Authentication run between the UE and the AUSF in the HPLMN leads to the establishment of $K_{AUSF}$, the second level key in the hierarchy. This key is not intended to leave the HPLMN and is used to secure the exchange of information between UE and HPLMN, such as for the provisioning of parameters to the UE from UDM in HPLMN. More precisely, $K_{AUSF}$ is used for integrity protection of messages delivered from HPLMN to UE. As described in 3GPP TS 33.501 (v17.0.0), such messages include Steering of Roaming (SoR) and the UDM parameter delivery procedures.

$K_{AUSF}$ is used to derive another key, KSEAF, that is sent to the serving PLMN. This key is then used by the serving PLMN to derive subsequent NAS and AS protection keys. These lower-level keys together with other security parameters (e.g., cryptographic algorithms, UE security capabilities, value of counters used for replay protection in various protocols, etc.) constitute the 5G security context as defined in 3GPP TS 33.501. However, $K_{AUSF}$ is not part of the UE's 5G security context that resides in the UE's serving PLMN.

3GPP TR 33.839 (v0.4.0) discusses a study on security aspects of enhancement of support for Edge Computing (EC) in 5GC for 3GPP Rel-17. Key issues discussed in 3GPP TR 33.839 include authentication, authorization, and transport security solutions for interfaces between clients and servers and for interfaces between different servers in an Edge data network. These servers can include Edge Configuration Servers (ECS), Edge Enabler Servers (EES), and Edge Application Servers (EAS). Relevant clients include Edge Enabler Client (EEC), which can be regarded an application that runs on the UE and communicates with the ECS and EES.

Figure 3:
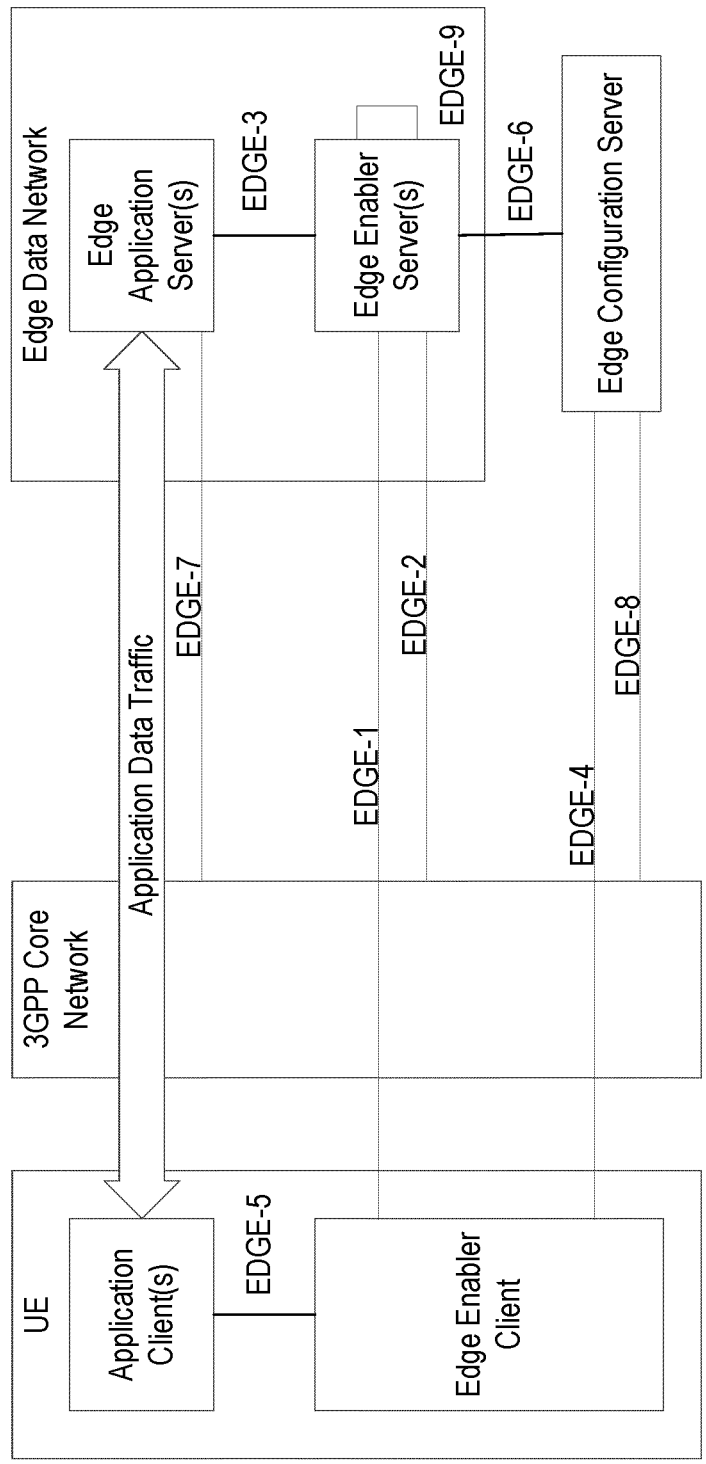
FIG. 3 shows a diagram of an exemplary application-layer architecture supporting edge computing (EC) applications in a 5G network.

3GPP TS 23.558 (v1.3.0) specifies the various client/server and server/server interfaces in the Rel-17 EC architecture. FIG. 3 shows a diagram of an exemplary application-layer architecture supporting EC applications. In addition to the ECS, EES, EAS, and EEC mentioned above, FIG. 3 also shows one or more application clients that run on the UE and communicate application data traffic with the EAS in the Edge Data Network. Additionally, FIG. 3 shows the following client/server and server/server interfaces defined in 3GPP TS 23.558:

EDGE-1: between EEC and EES.
EDGE-2: between EES and CN (e.g., 5GC).
EDGE-3: between EAS and EES.
EDGE-4: between EEC and ECS.
EDGE-5: between EEC and application client(s).
EDGE-6: between ECS and EES.
EDGE-7: between EAS and CN.
EDGE-8: between ECS and CN.
EDGE-9: between EES and EES.

In the architecture shown in FIG. 3, the EEC, which runs on the UE, needs to authenticate itself towards to the EES/ECS. The EEC provides a UE identifier (ID) for this purpose, as specified in 3GPP TS 23.558 clause 7.2.6. Currently, the only supported UE ID is the generic public subscription identifier (GPSI), which can be used inside and outside of 5G networks as further specified in 3GPP TS 23.501 (v16.7.0) and 23.003 (v16.5.0).

3GPP TS 23.558 (v1.3.0) also specifies a new edge enabler layer that includes the UE's EEC. In this arrangement, the UE uses an EEC ID as the client identifier on the edge enabler layer. As such, the EEC uses two different identifiers towards EES: EEC ID and UE identifier (e.g., GPSI). In other words, EES/ECS may need to authenticate two different identifiers associated with the UE.

Figure 4:
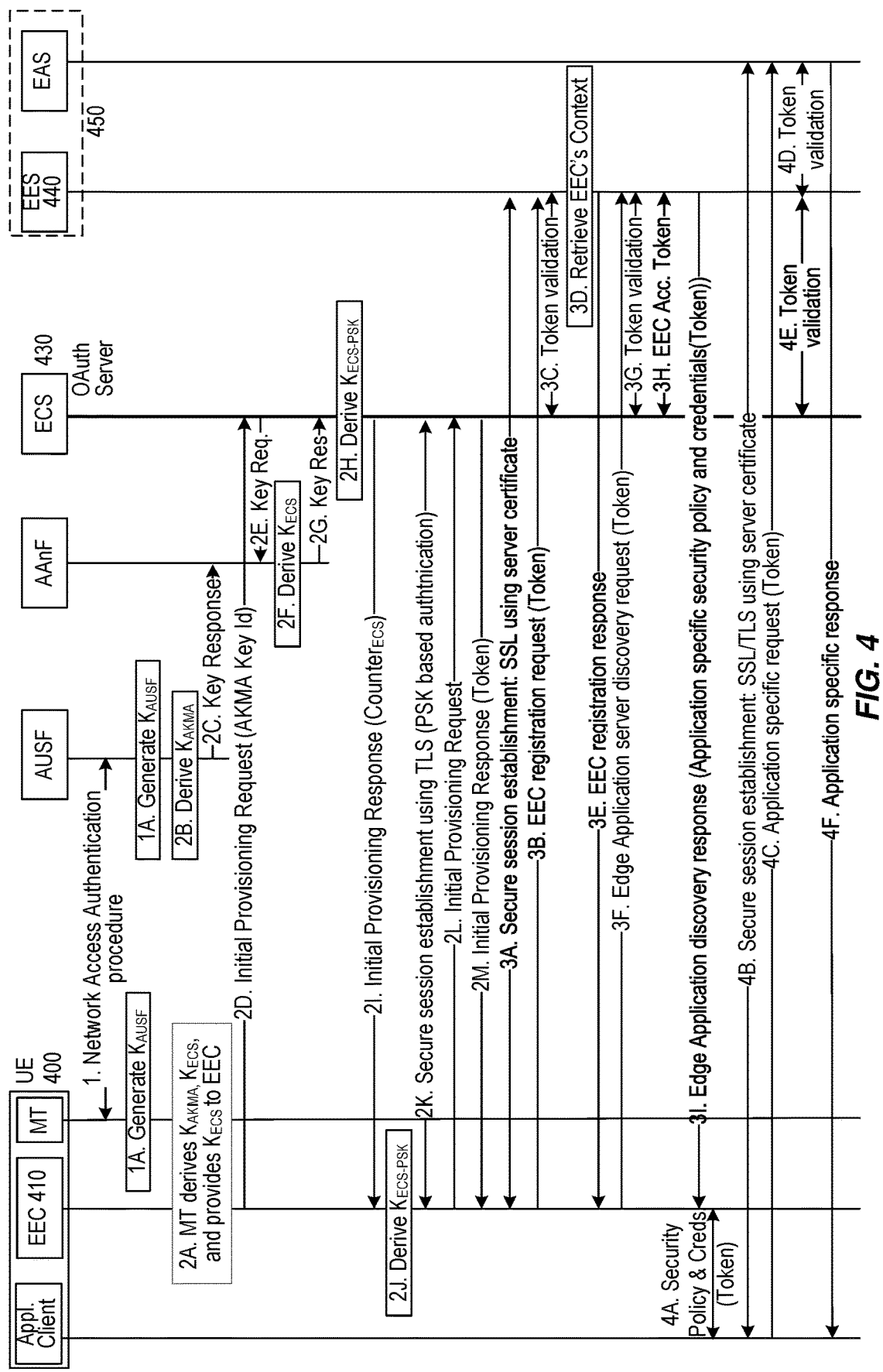
FIG. 4 shows a signal flow diagram of an exemplary technique for authentication of an EEC by an ECS and an EES.

Currently 3GPP TR 33.839 (v0.4.0) includes some proposals for the authentication of the EEC and for the authentication of GPSI by the EES/ECS. Proposals for authentication of the EEC include the following:

Based on transport layer security (TLS) certificates;
Based on AF key derived from AKMA procedure (or from similar procedures) as a pre-shared-key in TLS;

Using secondary authentication;

Authentication of EEC by ECS based on AKMA, and authentication of EEC by EES based on token provided by ECS to EEC. FIG. 4 shows an exemplary signal flow diagram of this proposal. A UE (400) includes an EEC (410) that communicates with an ECS (430) and an EES (440) in the Edge Data Network (450). A detailed description of this proposal is given in 3GPP TR 33.839 (v0.4.0) section 6.3.2, incorporated herein by reference in its entirety.

Proposals for authentication of GPSI include AKMA-based solutions and solutions based on an API of a network service that translates an IP address to the GPSI. Another proposal is for the binding of the UE GPSI to the ID of the UE's EEC based on a mapping table stored in the network (e.g., UDM).

However, each of these proposed solutions have various problems, issues, and/or difficulties. For example, the solutions that base EEC authentication on AKMA or secondary authentication can be used to authenticate the UE ID but not the applications that run on the UE. As another example, the solutions based on TLS certificates may not work in practice because there are no default certificates for the EEC (e.g., an application that runs on the UE) and it is unclear how, or by whom, non-default TLS certificate can be issued for this purpose. Moreover, the proposed solutions rely on separate authentication of the two identities (EEC ID and GPSI), but there is a need to bind these identities and no current solution for this need.

Embodiments of the present disclosure address these and other problems, issues, and/or difficulties by providing techniques for authentication of EEC ID by the ECS/EES based on tokens provided to the EEC by the party, entity, organization, and/or company that provides the EEC (also referred to as Edge Client Service Provider, ECSP). Embodiments also include techniques for binding of the two identities (i.e., EEC ID and UE ID) using the IP address of the client in the communication channel where both the EEC ID and UE ID are authenticated.

These embodiments can provide various benefits and/or advantages. For example, such techniques allow authentication of both identities (i.e., EEC ID and UE ID) at the same time with a proof that the EEC identified by the EEC ID is running on the UE identified by the UE ID. This can facilitate secure deployment of edge computing within 5G networks.

Various embodiments are described below in context of the respective interfaces to which they apply.

Figure 5:
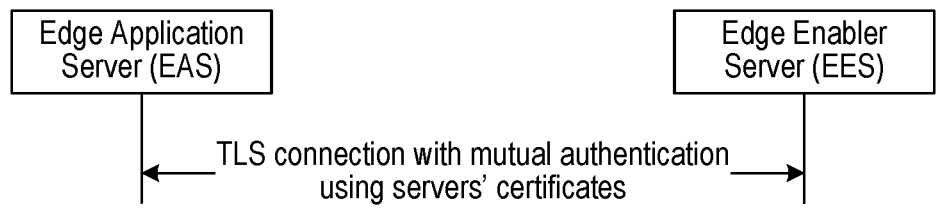
FIGS. 5-7 show signal flow diagrams of various techniques for authentication between different servers in an edge data network, according to various embodiments of the present disclosure.
Figure 6:
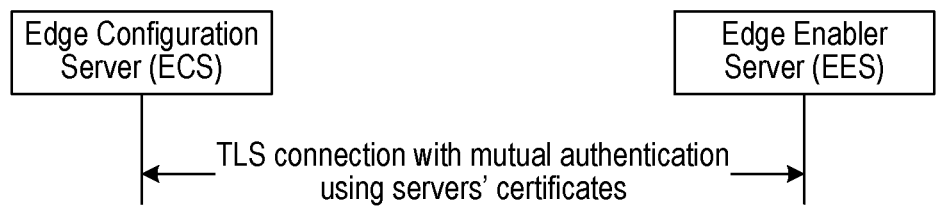
Figure 7:
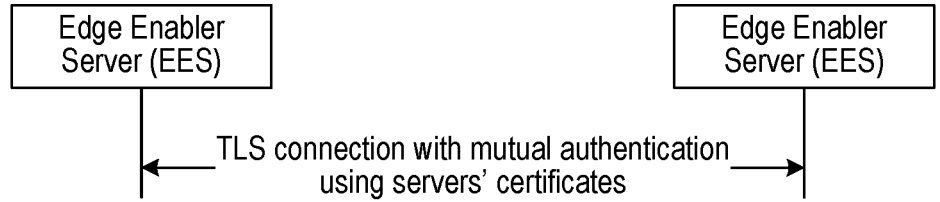

As shown in FIG. 3, both endpoints are servers on the EDGE-3, EDGE-6, and EDGE-9 interfaces. In some embodiments, the mutual authentication of the servers and the transport security of the interface are realized by using TLS with mutual authentication using the servers' certificates issued by certificate authorities (CAs) in public key infrastructure (PKI). A business relationship and service level agreement (SLA) between an ECSP and PKI/CA operator(s) is a necessary pre-requisite to operation of these embodiments. FIGS. 5-7 show signal flow diagrams for embodiments applicable to the EDGE-3, EDGE-6, and EDGE-9 interfaces, respectively.

Figure 8:
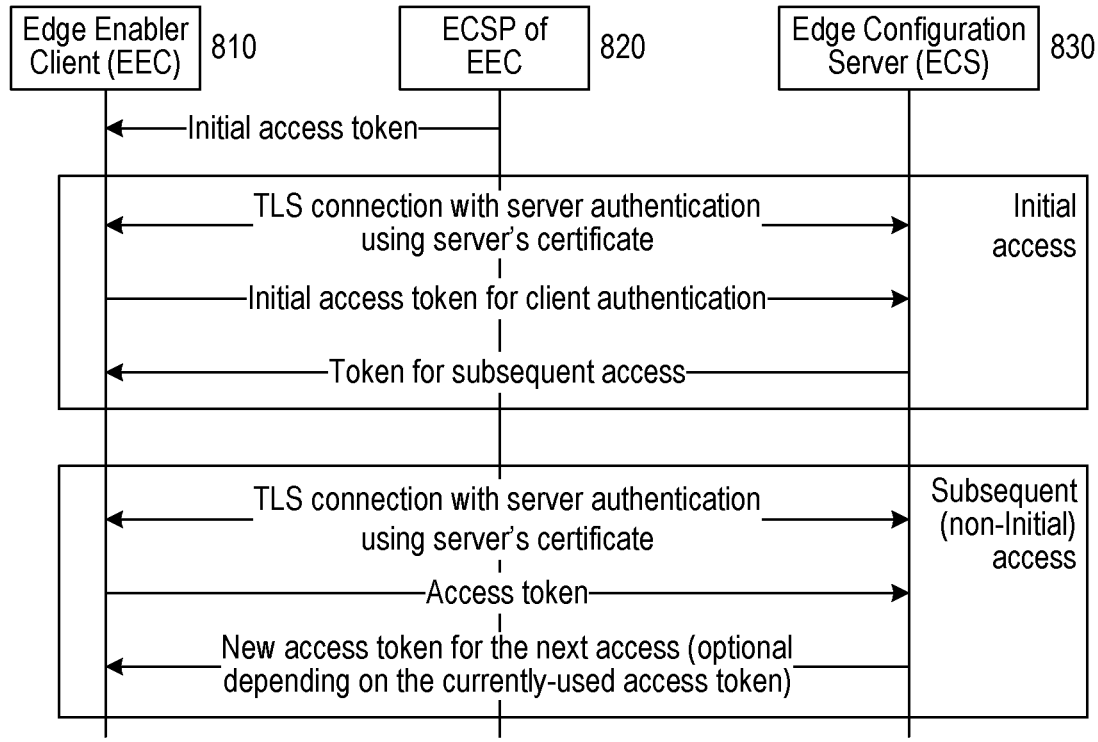
FIGS. 8-10 show signal flow diagrams of various techniques for authenticating an EEC, according to various embodiments of the present disclosure.

For the EDGE-4 interface between EEC and ECS, the authentication of the ECS and the transport security of the interface are realized by using TLS with server authentication using the server's (i.e., ECS) certificate issued by CAs in PKI. FIG. 8 shows a signal flow diagram between EEC (810), ECSP (820), and ECS (830) that illustrates some embodiments. As shown in FIG. 8, the ECSP initially provides a token to the EEC. After setup of a TLS connection with server authentication using the ECS certificate, the EEC uses the ECSP-provided access token for EEC authentication with the ECS, which then provides another token for subsequent access by the EEC. One pre-requisite is a business relationship between the ECSP and the ECS, such that the ECS can verify the token provided by ECSP. During the subsequent access, the ECS may decide whether to provide a new access token to the EEC based on, e.g., expiration time of the access token being used. If the ECS does not provide another access token, then the EEC can reuse the same access token.

Figure 9:
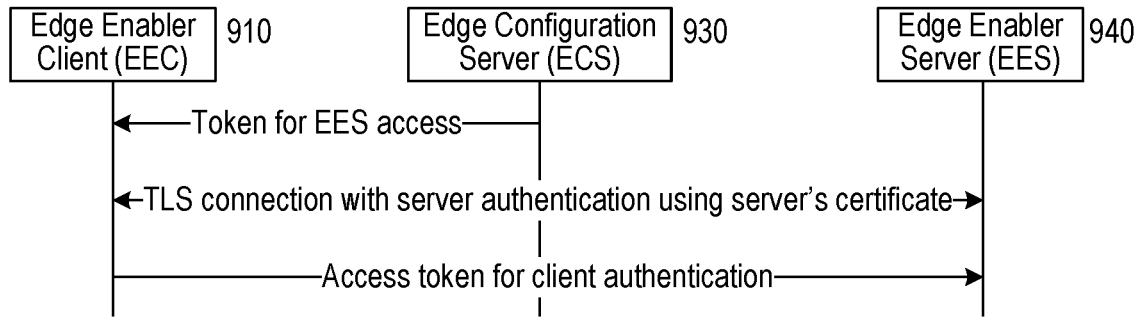

For the EDGE-1 interface between EEC and EES, the authentication of the EES and the transport security of the interface are realized by using TLS with server authentication using the server's (i.e., EES) certificate issued by CAs in PKI. FIG. 9 shows a signal flow diagram between EEC (910), ECS (930), and EES (940) that illustrates some embodiments. As shown in FIG. 9, the ECS initially provides a token to the EEC. After setup of a TLS connection with server authentication using the EES certificate, the EEC uses the ECS-provided access token for EEC authentication with the EES.

Figure 10:
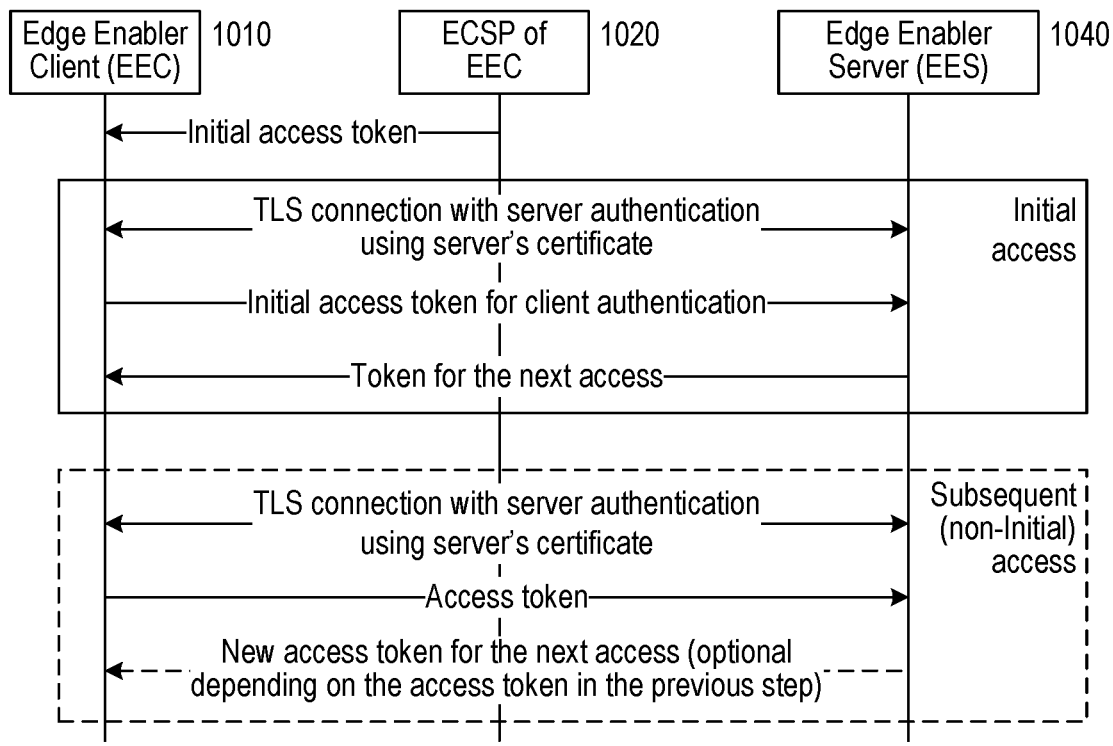

FIG. 10 shows a signal flow diagram between EEC (1010), ECSP (1020), and EES (1040) that illustrates other embodiments applicable to the EDGE-1 interface. In these embodiments, the ECSP provides an initial access token to the EEC. After setup of a TLS connection with server authentication using the EES certificate, the EEC uses the ECSP-provided access token for EEC authentication with the EES, which then provides another token for subsequent access by the EEC. One pre-requisite is a business relationship between the ECSP and the EES, such that the EES can verify the token provided by ECSP. During the subsequent access, the EES may decide whether to provide a new access token to the EEC based on, e.g., expiration time of the access token currently being used. If the EES does not provide another access token, then the EEC can reuse the same access token.

In the above-described embodiments, the profile for TLS implementation and usage should preferably follow the provisions given in 3GPP TS 33.310 (v16.6.0) Annex E and 3GPP TS 33.210 (v16.4.0) section 6.2. Authentication between applications on the UE (ACs) and servers (EASs) may be dependent on the Operating System of the UE, and thus not in scope of this disclosure. 3GPP TS 23.558 (v1.3.0) clause 7.2.6 specifies different interactions between EEC and EES/ECS that use the UE ID for identifying the UE. The only example for the UE ID is the GPSI, which also requires authentication.

In some embodiments, GPSI authentication can be done using AKMA or an IP address-to-GPSI translation API. For example, ECS and EES compare the IP addresses of the EEC and of the UE, respectively, used in the authentication procedures of the EEC ID and UE ID. When the IP addresses match for the two authentication procedures, the ECS/EES determine that the EEC having the EEC ID is running on the UE having the UE ID.

Figure 11:
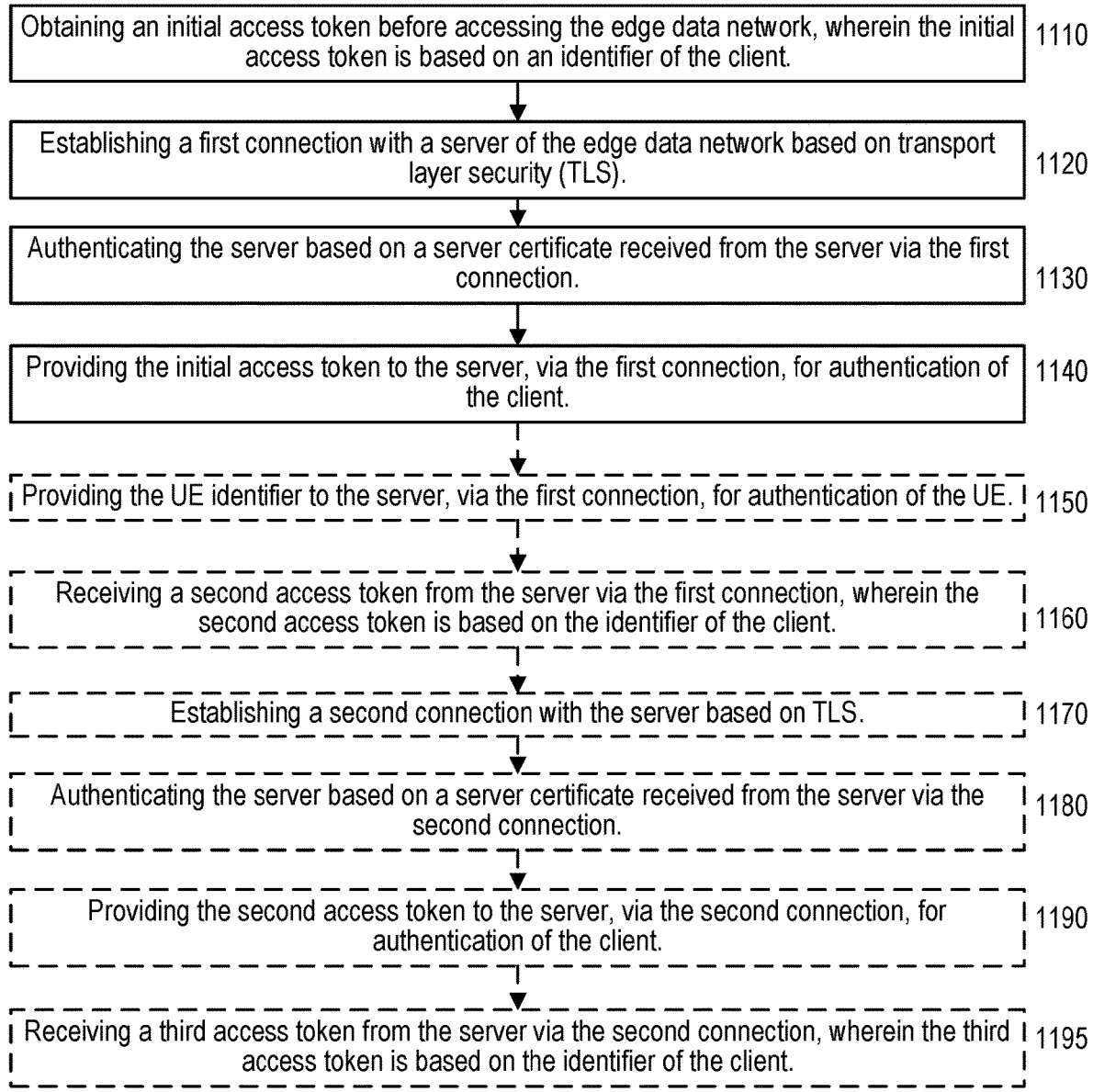
FIG. 11 shows an exemplary method (e.g., procedure) for a client in an edge data network, according to various embodiments of the present disclosure.
Figure 12:
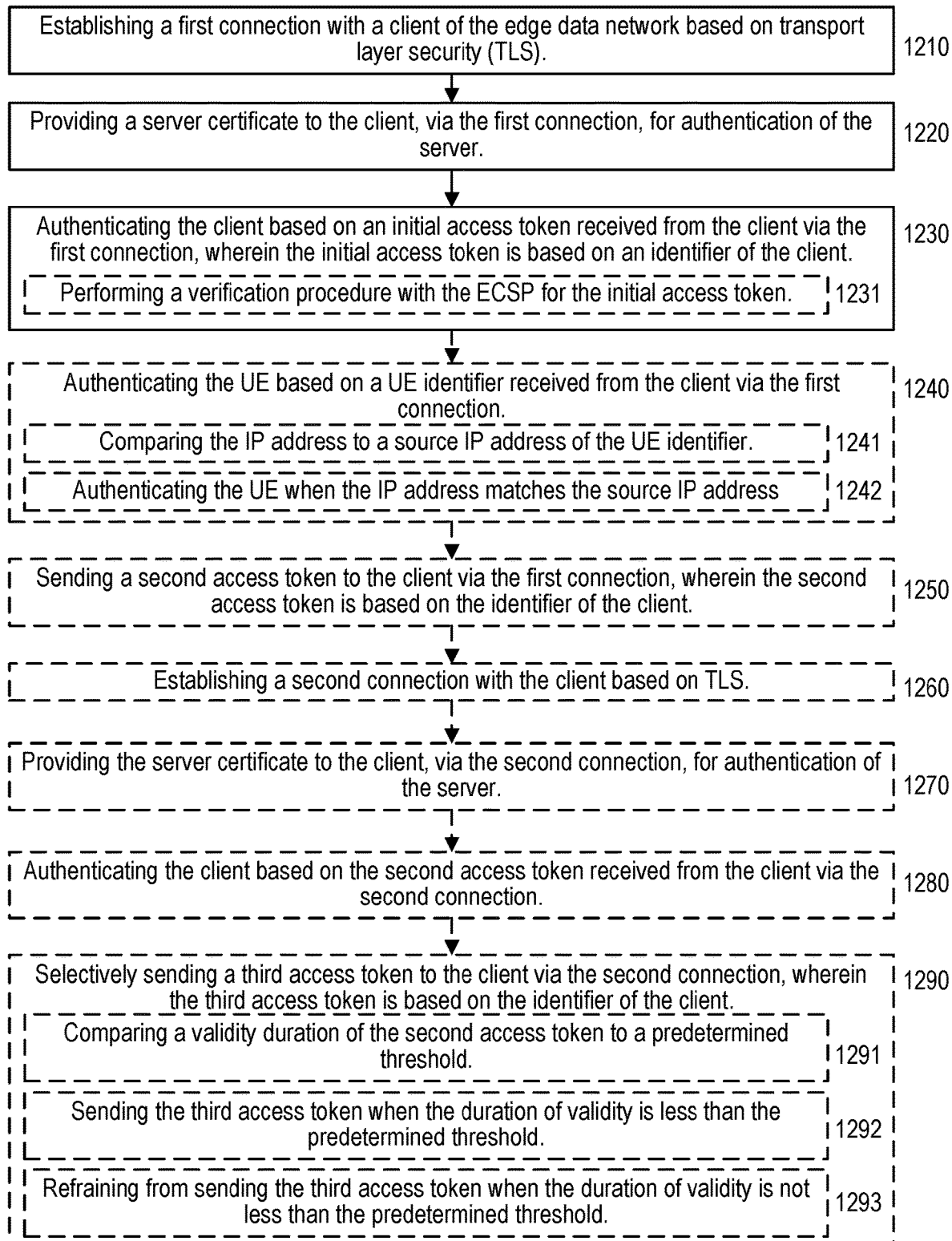
FIG. 12 shows an exemplary method (e.g., procedure) for a server in an edge data network, according to various embodiments of the present disclosure.

The embodiments described above can be further illustrated with reference to FIGS. 11-12, which depict exemplary methods (e.g., procedures) performed by a client and a server in an edge data network, respectively. Put differently, various features of the operations described below correspond to various embodiments described above. The exemplary methods shown in FIGS. 11-12 can be complementary to each other such that they can be used cooperatively to provide benefits, advantages, and/or solutions to problems described herein. Although the exemplary methods are illustrated in FIGS. 11-12 by specific blocks in particular orders, the operations corresponding to the blocks can be performed in different orders than shown and can be combined and/or divided into operations having different functionality than shown. Optional blocks and/or operations are indicated by dashed lines.

More specifically, FIG. 11 illustrates an exemplary method (e.g., procedure) for a client in an edge data network (e.g., 5G network), according to various embodiments of the present disclosure. The exemplary method shown in FIG. 11 can be performed by an edge client of a UE (e.g., wireless device), such as described elsewhere herein.

The exemplary method can include the operations of block 1110, where the client can obtain an initial access token before accessing the edge data network. The initial access token is based on an identifier of the client (e.g., EEC ID). The exemplary method can also include the operations of block 1120, where the client can establish a first connection with a server of the edge data network based on TLS. The exemplary method can also include the operations of block 1130, where the client can authenticate the server based on a server certificate received from the server via the first connection. The exemplary method can also include the operations of block 1140, where the client can provide the initial access token to the server, via the first connection, for authentication of the client.

In some embodiments, the exemplary method can also include the operations of block 1160, where the client can subsequently (e.g., after authentication of the client by the server based on the initial access token) receive a second access token from the server via the first connection. The second access token is also based on the identifier of the client.

In some of these embodiments, the exemplary method can also include the operations of blocks 1170-1190. In block 1170, the client can subsequently establish a second connection with the server based on TLS. This can be done, for example, sometime after the first connection has been disconnected, removed, deactivated, etc. In block 1180, the client can authenticate the server based on a server certificate received from the server via the second connection. In block 1190, the client can provide the second access token to the server, via the second connection, for authentication of the client. In some variants, the exemplary method can also include the operations of block 1195, where the client can subsequently (e.g., after authentication of the client by the server based on the second access token) receive a third access token from the server via the second connection. The third access token is also based on the identifier of the client.

In some embodiments, the first connection is associated with an IP address and the client is hosted by a UE that is associated with a UE identifier. In such embodiments, the exemplary method can also include the operations of block 1150, where the UE can provide the UE identifier to the server, via the first connection, for authentication of the UE.

In some embodiments, the client is an EEC and the server is an ECS or an EES. In some of these embodiments, the initial access token can be obtained from an ECSP that is associated with the EEC. Examples of these embodiments are shown in FIGS. 8 and 10. In other of these embodiments, the server is an EES and the initial access token is obtained from an ECS. An example of these embodiments is shown in FIG. 9.

In addition, FIG. 12 illustrates an exemplary method (e.g., procedure) for a server in an edge data network (e.g., 5G network), according to various embodiments of the present disclosure. The exemplary method shown in FIG. 12 can be performed by any appropriate server (e.g., EES, ECS, etc.) such as described elsewhere herein.

The exemplary method can include the operations of block 1210, where the server can establish a first connection with a client of the edge data network based on TLS. The exemplary method can also include the operations of block 1220, where the server can provide a server certificate to the client, via the first connection, for authentication of the server. The exemplary method can also include the operation of block 1230, where the server can authenticate the client based on an initial access token received from the client via the first connection. The initial access token is based on an identifier of the client (e.g., EEC ID).

In some embodiments, the exemplary method can also include the operations of block 1250, where the server can, after authenticating the client based on the initial access token (e.g., in block 1130), send a second access token to the client via the first connection. The second access token is also based on the identifier of the client.

In some of these embodiments, the exemplary method can also include the operations of blocks 1260-1280. In block 1260, the server can subsequently establish a second connection with the client based on TLS. This can be done, for example, sometime after the first connection has been disconnected, removed, deactivated, etc. In block 1270, the server can provide the server certificate to the client, via the second connection, for authentication of the server. In block 1280, the server can authenticate the client based on the second access token received from the client via the second connection.

In some of these embodiments, the exemplary method can also include the operations of block 1290, where the server can, after authenticating the client based on the second access token (e.g., in block 1280), selectively send a third access token to the client via the second connection. The third access token is based on the identifier of the client. In some embodiments, the selectively sending operations of block 1290 can include the operations of sub-blocks 1291-1293, where the server can compare a duration of validity of the second access token to a predetermined threshold; send the third access token when the duration of validity is less than the predetermined threshold; and refrain from sending the third access token when the duration of validity is not less than the predetermined threshold.

In some embodiments, the client is hosted by a UE that is associated with a UE identifier. In such embodiments, the exemplary method can also include the operations of block 1240, where the server can authenticate the UE based on the UE identifier, which received from the UE via the first connection. In some of these embodiments, the first connection is associated with an IP address and the authenticating operations of block 1240 can include the operations of sub-blocks 1241-1242, where the server can compare the IP address to a source IP address of the UE identifier and authenticate the UE when the IP address matches the source IP address.

In some embodiments, the client is an EEC and the server is an ECS or an EES.

In some of these embodiments, the initial access token can be associated with an ECSP that is associated with the EEC. Examples of these embodiments are shown in FIGS. 8 and 10. In such embodiments, the authenticating the client in block 1230 can include the operations of sub-block 1231, where the server can perform a verification procedure with the ECSP for the initial access token.

In other of these embodiments, the server is an EES and the initial access token is obtained from an ECS. An example of these embodiments is shown in FIG. 9.

Figure 13:
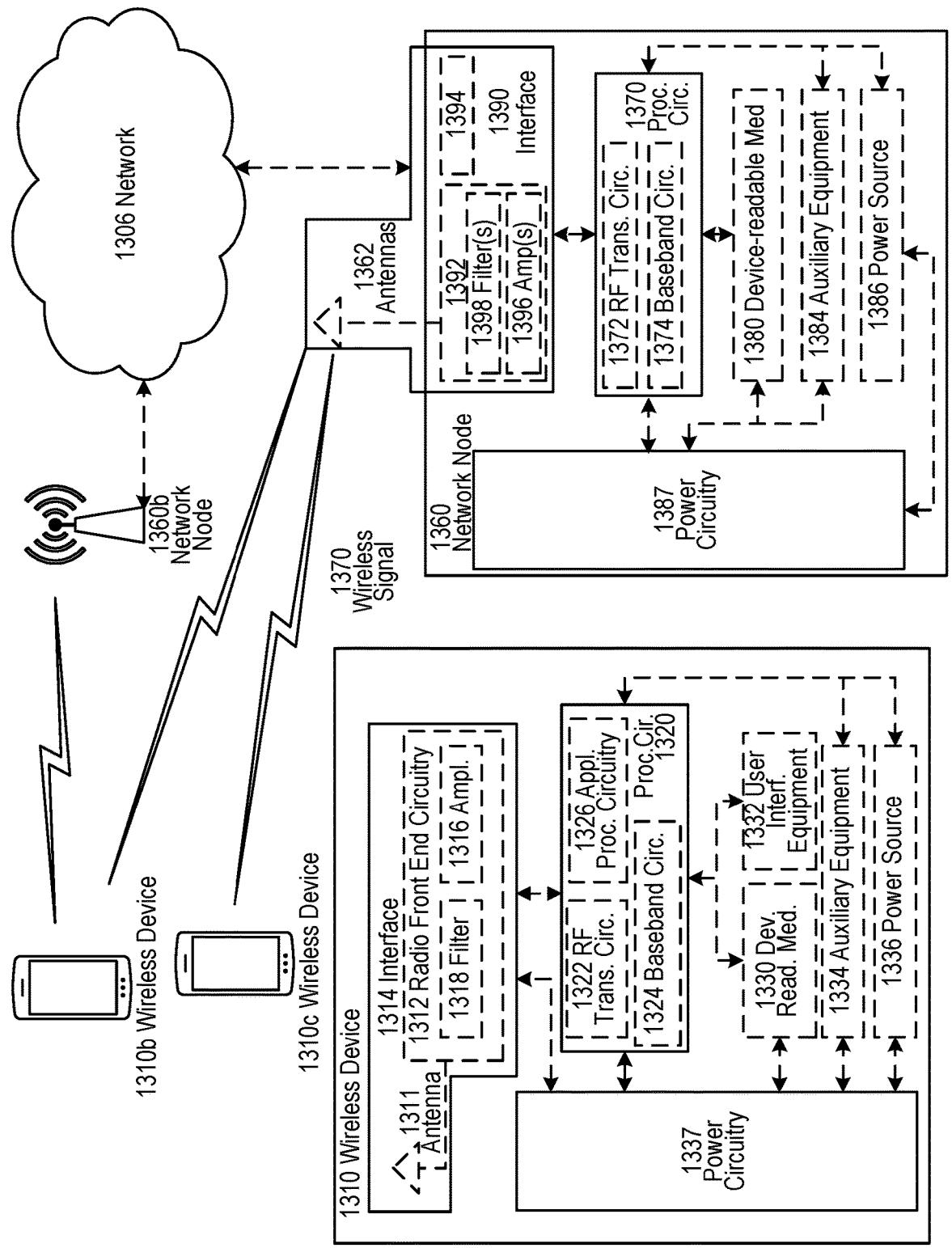
FIG. 13 illustrates a wireless network, according to various embodiments of the present disclosure.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, edge data networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and an RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1360, either alone or in conjunction with other network node 1360 components (e.g., device readable medium 1380). Such functionality can include any of the various wireless features, functions, or benefits discussed herein.

For example, processing circuitry 1370 can execute instructions stored in device readable medium 1380 or in memory within processing circuitry 1370. In some embodiments, processing circuitry 1370 can include a system on a chip (SOC). As a more specific example, instructions (also referred to as a computer program product) stored in medium 1380 can include instructions that, when executed by processing circuitry 1370, can configure network node 1360 to perform operations corresponding to various exemplary methods (e.g., procedures) described herein.

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360 but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

In some embodiments, a wireless device (WD, e.g., WD 1310) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1310 functionality either alone or in combination with other WD 1310 components, such as device readable medium 1330. Such functionality can include any of the various wireless features or benefits discussed herein.

For example, processing circuitry 1320 can execute instructions stored in device readable medium 1330 or in memory within processing circuitry 1320 to provide the functionality disclosed herein. More specifically, instructions (also referred to as a computer program product) stored in medium 1330 can include instructions that, when executed by processor 1320, can configure wireless device 1310 to perform operations corresponding to various exemplary methods (e.g., procedures) described herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
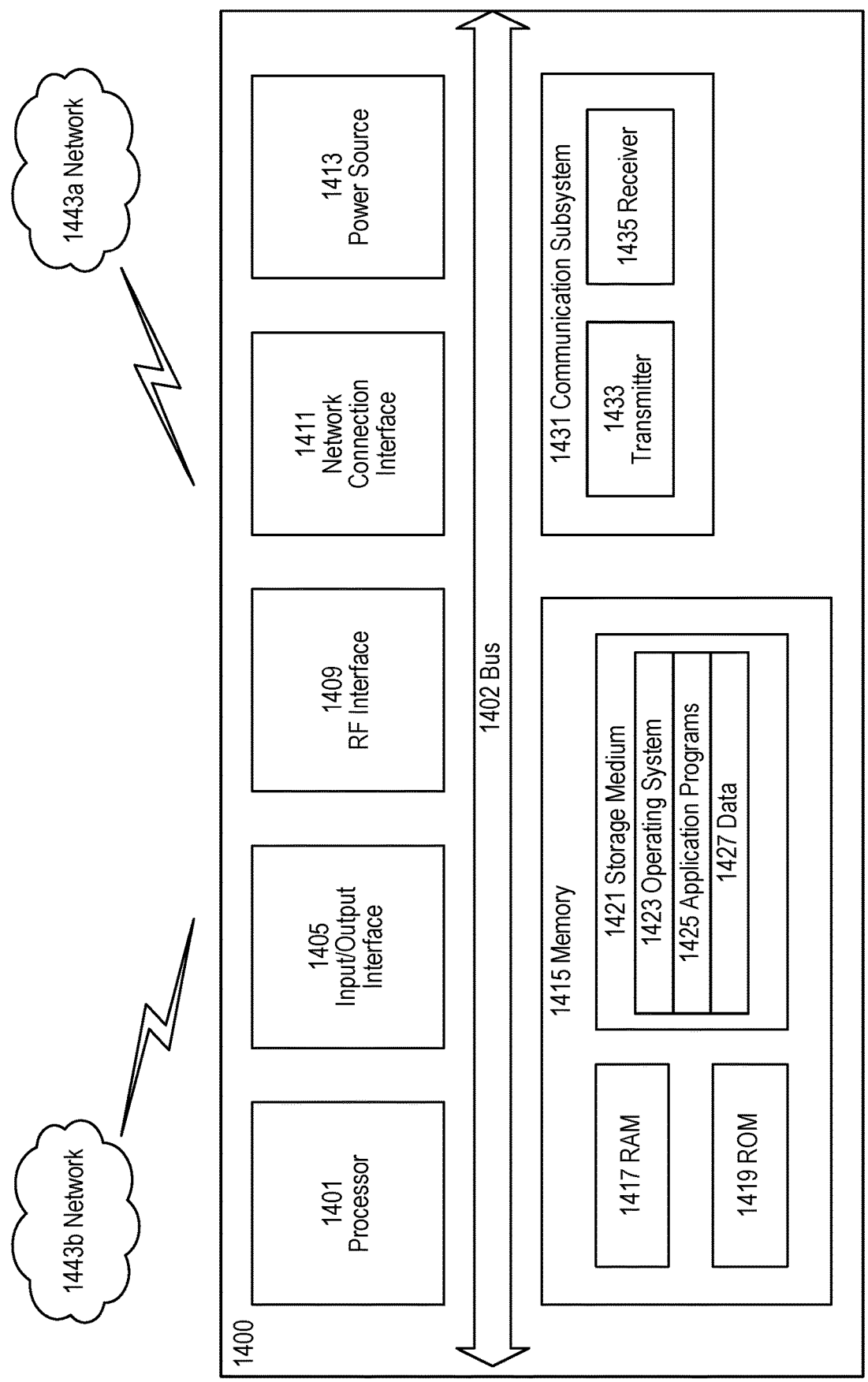
FIG. 14 shows an embodiment of a UE, in accordance with various aspects described herein.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1400 can be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443*a*. Network 1443*a* can encompass wired and/or wireless networks such as a local-area network (LAN), a wide-area network (WAN), a computer network, a wireless network, a telecommunications network, another like network (such as an Edge Data Network, described above) or any combination thereof. For example, network 1443*a* can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1421 can be configured to include operating system 1423; application program 1425 such as a web browser application, a widget or gadget engine or another application; and data file 1427. Storage medium 1421 can store, for use by UE 1400, any of a variety of various operating systems or combinations of operating systems. For example, application program 1425 can include executable program instructions (also referred to as a computer program product) that, when executed by processor 1401, can configure UE 1400 to perform operations corresponding to various exemplary methods (e.g., procedures) described herein.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443*b* using communication subsystem 1431. Network 1443*a* and network 1443*b* can be the same network or networks or different network or networks. Communication subsystem 1431 can be configured to include one or more transceivers used to communicate with network 1443*b*. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443*b* can encompass wired and/or wireless networks such as a local-area network (LAN), a wide-area network (WAN), a computer network, a wireless network, a telecommunications network, another like network or any combination thereof. For example, network 1443*b* can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
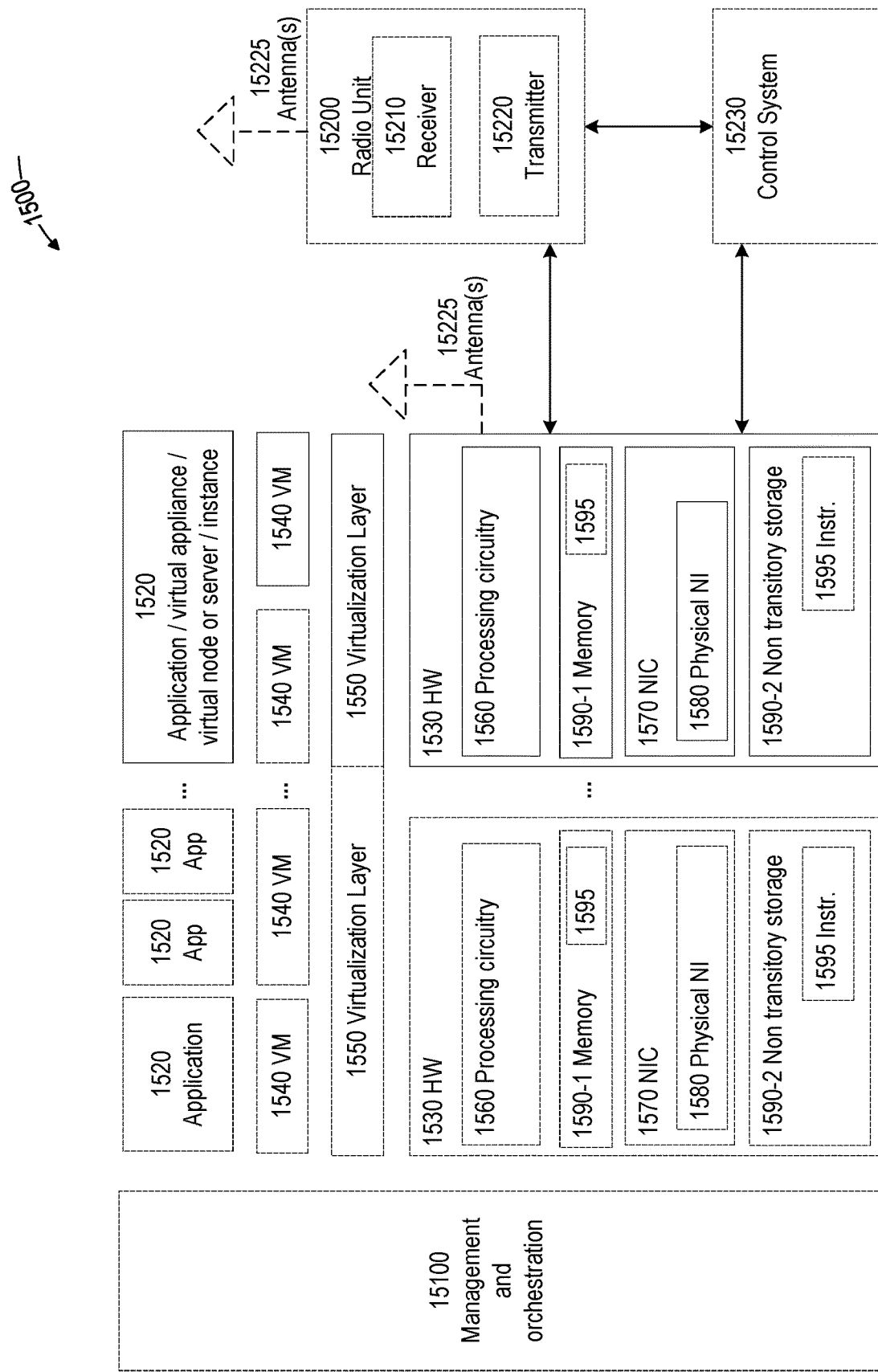
FIG. 15 is a block diagram illustrating an exemplary virtualization environment usable for implementation of various embodiments of network nodes or NFs described herein.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500 can include general-purpose or special-purpose network hardware devices (or nodes) 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. For example, instructions 1595 can include program instructions (also referred to as a computer program product) that, when executed by processing circuitry 1560, can configure hardware node 1520 to perform operations corresponding to various exemplary methods (e.g., procedures) described herein. Such operations can also be attributed to virtual node(s) 1520 that is/are hosted by hardware node 1530.

Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 15230, which can alternatively be used for communication between the hardware nodes 1530 and radio units 15200.

Figure 16:
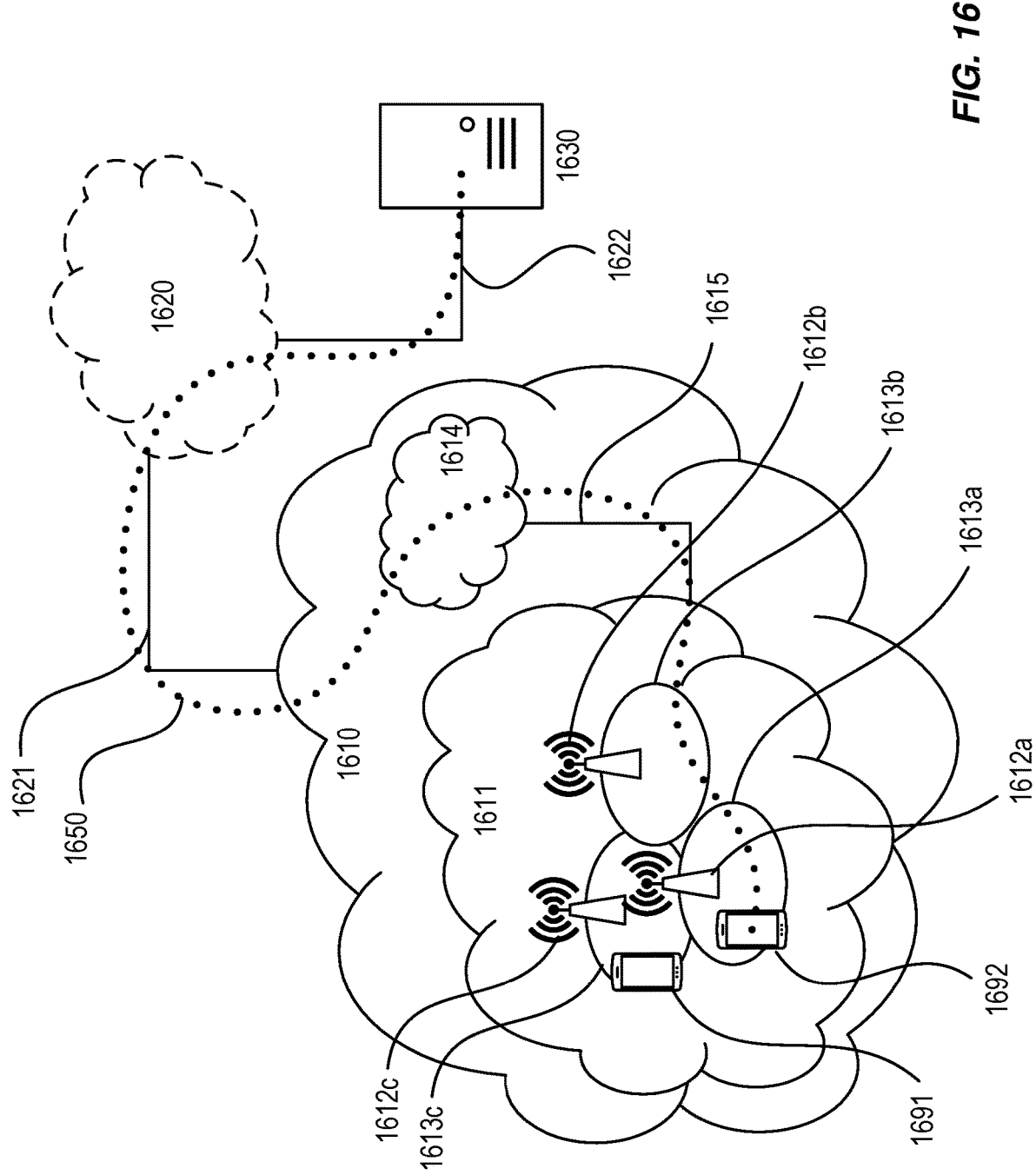
FIGS. 16-17 are block diagrams of various exemplary communication systems and/or networks, according to various embodiments of the present disclosure.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c can be configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct, or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions.

Base station 1720 also includes software 1721 stored internally or accessible via an external connection. For example, software 1721 can include program instructions (also referred to as a computer program product) that, when executed by processing circuitry 1728, can configure base station 1720 to perform operations corresponding to various exemplary methods (e.g., procedures) described herein.

Communication system 1700 can also include UE 1730 already referred to, whose hardware 1735 can include radio interface 1737 configured to set up and maintain wireless connection 1770 with a base station serving a coverage area in which UE 1730 is currently located. Hardware 1735 of UE 1730 can also include processing circuitry 1738, which can comprise one or more programmable processors, application-specific integrated circuits, field programmable gate arrays or combinations of these (not shown) adapted to execute instructions.

UE 1730 also includes software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data. Client application 1732 can interact with the user to generate the user data that it provides. Software 1731 can also include program instructions (also referred to as a computer program product) that, when executed by processing circuitry 1738, can configure UE 1730 to perform operations corresponding to various exemplary methods (e.g., procedures) described herein.

Figure 17:
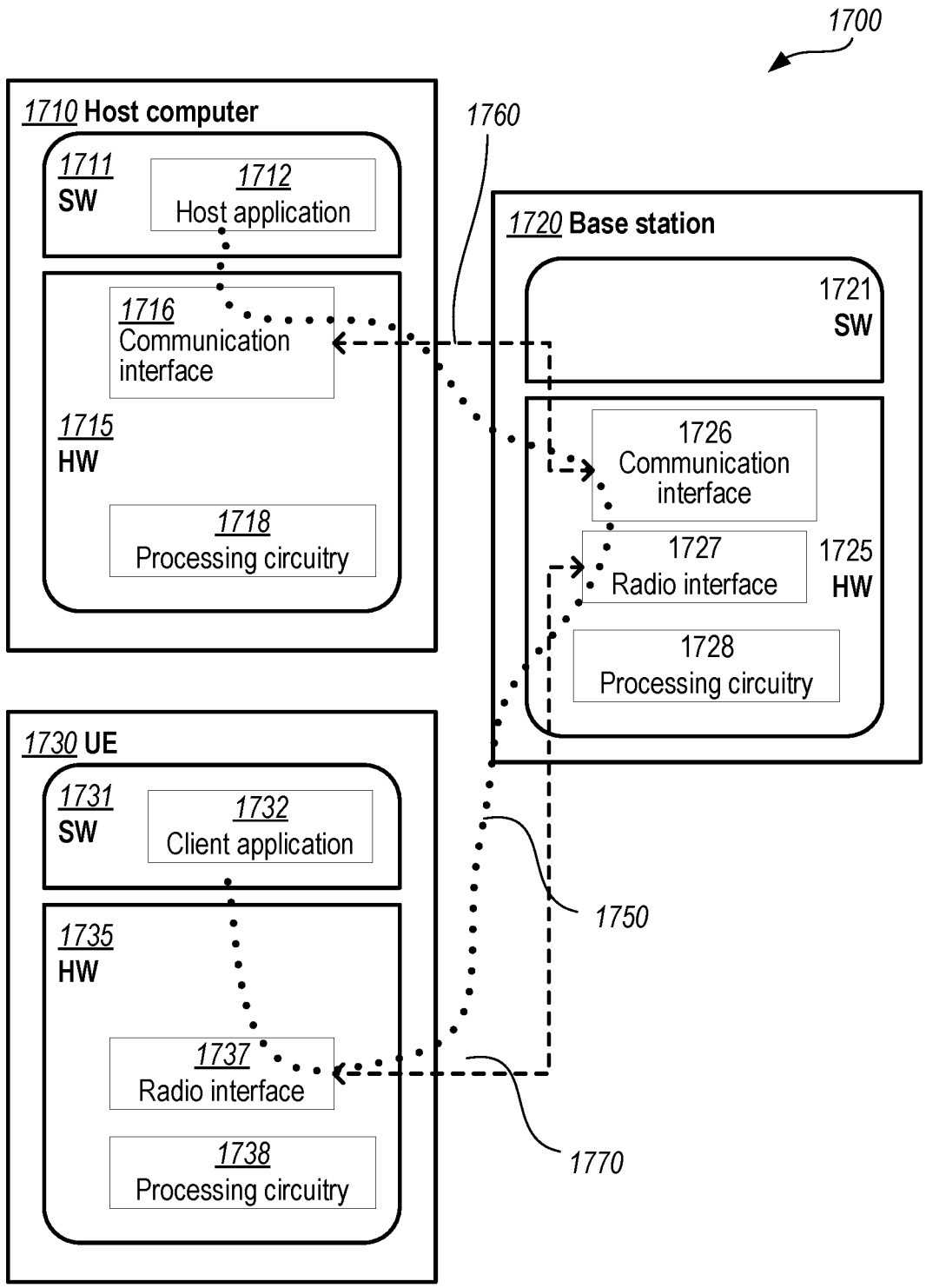

As an example, host computer 1710, base station 1720 and UE 1730 illustrated in FIG. 17 can be similar or identical to host computer 1630, one of base stations 1612*a*, 1612*b*, 1612*c* and one of UEs 1691, 1692 of FIG. 16, respectively. This is to say, the inner workings of these entities can be as shown in FIG. 17 and independently, the surrounding network topology can be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1750 between host computer 1710 and UE 1730, in response to variations in the measurement results. The measurement procedure and/or the network functionality for reconfiguring OTT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OTT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OTT connection 1750 while it monitors propagation times, errors, etc.

FIG. 18 is a flowchart illustrating an exemplary method and/or procedure implemented in a communication system, in accordance with one embodiment. The communication system includes a host computer, a base station and a UE which, in some embodiments, can be those described with reference to other figures herein. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 of the method, the host computer provides user data. In an optional sub step (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Examples of the techniques and apparatus described herein include, but are not limited to, the following enumerated embodiments:

A1. A method for a client in an edge data network, the method comprising:
  obtaining an initial access token before access the edge data network, wherein the initial access token is based on an identifier of the client;
  establishing a first connection with a server of the edge data network based on transport layer security (TLS);
  authenticating the server via the first connection based on a server certificate; and
  providing the initial access token to the server, via the first connection, for authentication of the client.

A2. The method of embodiment A1, further comprising after authentication of the client based on the initial access token, receiving a second access token from the server via the first connection, wherein the second access token is based on the identifier of the client.

A3. The method of embodiment A2, further comprising:
  subsequently establishing a second connection with the server based on TLS;
  authenticating the server via the second connection based on a server certificate; and
  providing the second access token to the server, via the second connection, for authentication of the client.

A4. The method of embodiment A3, further comprising after authentication of the client based on the second access token, receiving a third access token from the server via the second connection, wherein the third access token is based on the identifier of the client.

A5. The method of any of embodiments A1-A4, wherein:
  the first connection is associated with an Internet Protocol (IP) address;
  the client is hosted by a user equipment (UE) that is associated with a UE identifier; and
  the method further comprises providing the UE identifier to the server, via the first connection, for authentication of the UE.

A6. The method of any of embodiments A1-A5, wherein the client is an Edge Enabler Client (EEC); and
  the server is an Edge Configuration Server (ECS) or an Edge Enabler Server (EES).

A7. The method of embodiment A6, wherein the initial access token is obtained from an edge computing service provider (ECSP) that is associated with the EEC.

A8. The method of embodiment A6, wherein the server is an EES and the initial access token is obtained from an ECS.

B1. A method for a server in an edge data network, the method comprising:
  establishing a first connection with a client of the edge data network based on transport layer security (TLS);
  providing a server certificate to the client, via the first connection, for authentication of the server; and
  authenticating the client based on an initial access token received from the client via the first connection, wherein the initial access token is based on an identifier of the client.

B2. The method of embodiment B 1, further comprising after authentication of the client based on the initial access token, sending a second access token to the client via the first connection, wherein the second access token is based on the identifier of the client.

B3. The method of embodiment B2, further comprising:
  subsequently establishing a second connection with the client based on TLS;
  providing the server certificate to the client, via the second connection, for authentication of the server; and
  authenticating the client based on the second access token received from the client via the second connection.

B4. The method of embodiment B3, further comprising after authentication of the client based on the second access token, selectively sending a third access token to the client via the second connection, wherein the third access token is based on the identifier of the client.

B5. The method of embodiment B4, wherein selectively sending comprises:

comparing a duration of validity of the second access token to a predetermined threshold;
sending the third access token when the duration of validity is less than the predetermined threshold; and
refraining from sending the third access token when the duration of validity is not less than the predetermined threshold.

B6. The method of any of embodiments B1-B5, wherein:
the client is hosted by a user equipment (UE) that is associated with a UE identifier; and
the method further comprises authenticating the UE based on the UE identifier received from the UE.

B7. The method of B6, wherein:
the first connection is associated with an Internet Protocol (IP) address; and
authenticating the UE comprises:
  comparing the IP address to a source IP address of the UE identifier; and
  authenticating the UE when the IP address matches the source IP address.

B8. The method of any of embodiments B1-B7, wherein the client is an Edge Enabler Client; and
the server is an Edge Configuration Server (ECS) or an Edge Enabler Server (EES).

B9. The method of embodiment B7, wherein:
the initial access token is associated with an edge computing service provider (ECSP) that is associated with the EEC; and
authenticating the client based on the initial access token comprises performing a verification procedure with the ECSP for the initial access token.

B10. The method of embodiment A6, wherein the server is an EES and the initial access token is obtained from an ECS.

C1. A user equipment (UE) comprising a client for an edge data network, the UE comprising:
communication interface circuitry configured to facilitate communication between the client and one or more servers of the edge data network; and
processing circuitry operably coupled to the communication interface circuitry, whereby the processing circuitry and communication interface circuitry are configured to perform operations corresponding to any of the methods of embodiments A1-A8.

C2. A user equipment (UE) comprising a client for an edge data network, the client being configured to perform operations corresponding to any of the methods of embodiments A1-A8.

C3. A non-transitory, computer-readable medium storing computer-executable instructions that, when executed by processing circuitry associated with a client for an edge data network, configure the client to perform operations corresponding to any of the methods of embodiments A1-A8.

C4. A computer program product comprising computer-executable instructions that, when executed by processing circuitry associated with a client for an edge data network, configure the client to perform operations corresponding to any of the methods of embodiments A1-A8.

D1. A server configured for an edge data network, the server comprising:
communication interface circuitry configured to communicate with one or more clients for the edge data network; and
processing circuitry operably coupled to the interface circuitry, whereby the processing circuitry and the communication interface circuitry are configured to perform operations corresponding to any of the methods of embodiments B1-B10.

D2. A server configured for an edge data network, the server being configured to perform operations corresponding to any of the methods of embodiments B1-B10.

D3. A non-transitory, computer-readable medium storing computer-executable instructions that, when executed by processing circuitry associated with a server configured for an edge data network, configure the server to perform operations corresponding to any of the methods of embodiments B1-B10.

D4. A computer program product comprising computer-executable instructions that, when executed by processing circuitry associated with a server configured for an edge data network, configure the server to perform operations corresponding to any of the methods of embodiments B1-B10.

The invention claimed is:

1. A method performed by a client configured to operate in an edge data network, wherein the client is hosted by a user equipment (UE) that is associated with a UE identifier, the method comprising:
obtaining an initial access token before accessing the edge data network, wherein the initial access token is based on an identifier of the client;
establishing a first connection with a server of the edge data network based on transport layer security (TLS), wherein the first connection is associated with an Internet Protocol (IP) address;
authenticating the server based on a server certificate received from the server via the first connection;
providing the UE identifier to the server, via the first connection, for authentication of the UE; and
providing the initial access token to the server, via the first connection, for authentication of the client.

2. The method of claim 1, further comprising subsequently receiving a second access token from the server via the first connection, wherein the second access token is based on the identifier of the client.

3. The method of claim 2, further comprising:
subsequently establishing a second connection with the server based on TLS;
authenticating the server based on a server certificate received from the server via the second connection; and
providing the second access token to the server, via the second connection, for authentication of the client.

4. The method of claim 3, further comprising subsequently receiving a third access token from the server via the second connection, wherein the third access token is based on the identifier of the client.

5. The method of claim 1, wherein the client is an Edge Enabler Client (EEC), and the server is an Edge Configuration Server (ECS) or an Edge Enabler Server (EES).

6. The method of claim 5, wherein one of the following applies:
the initial access token is obtained from an edge computing service provider (ECSP) that is associated with the EEC; or
the server is an EES and the initial access token is obtained from an ECS.

7. A non-transitory, computer-readable medium storing computer-executable instructions that, when executed by processing circuitry associated with a client for an edge data network, configure the client to perform operations corresponding to the method of claim 1.

8. A method performed by a server configured to operate in an edge data network, the method comprising:

establishing a first connection with a client of the edge data network based on transport layer security (TLS) wherein:
the client is hosted by a user equipment (UE) that is associated with a UE identifier, and the first connection is associated with an Internet Protocol (IP) address;
providing a server certificate to the client, via the first connection, for authentication of the server;
authenticating the UE based on the UE identifier, which is received from the UE via the first connection; and
authenticating the client based on an initial access token received from the client via the first connection, wherein the initial access token is based on an identifier of the client.

9. The method of claim 8, further comprising after authenticating the client based on the initial access token, sending a second access token to the client via the first connection, wherein the second access token is based on the identifier of the client.

10. The method of claim 9, further comprising:
subsequently establishing a second connection with the client based on TLS;
providing the server certificate to the client, via the second connection, for authentication of the server; and
authenticating the client based on the second access token received from the client via the second connection.

11. The method of claim 10, further comprising after authenticating client based on the second access token, selectively sending a third access token to the client via the second connection, wherein the third access token is based on the identifier of the client.

12. The method of claim 11, wherein selectively sending the third access token comprises:
comparing a duration of validity of the second access token to a predetermined threshold;
sending the third access token when the duration of validity is less than the predetermined threshold; and
refraining from sending the third access token when the duration of validity is not less than the predetermined threshold.

13. The method of 8, wherein authenticating the UE comprises:
comparing the IP address to a source IP address associated with the UE identifier; and
authenticating the UE when the IP address matches the source IP address.

14. The method of claim 8, wherein the client is an Edge Enabler Client, and the server is an Edge Configuration Server (ECS) or an Edge Enabler Server (EES).

15. The method of claim 14, wherein either:
the initial access token is associated with an edge computing service provider (ECSP) that is associated with the EEC, and authenticating the client based on the initial access token comprises performing a verification procedure with the ECSP for the initial access token; or
the server is an EES and the initial access token is obtained from an ECS.

16. A non-transitory, computer-readable medium storing computer-executable instructions that, when executed by processing circuitry associated with a server configured to operate in an edge data network, configure the server to perform operations corresponding to the method of claim 8.

17. A user equipment (UE) configured to host a client for an edge data network, the UE being associated with a UE identifier, the UE comprising:
communication interface circuitry configured to facilitate communication between the client and a plurality of servers; and
processing circuitry operably coupled to the communication interface circuitry, whereby the processing circuitry and communication interface circuitry are configured to:
obtain an initial access token before accessing the edge data network, wherein the initial access token is based on an identifier of the client;
establish a first connection with a server of the edge data network based on transport layer security (TLS), wherein the first connection is associated with an Internet Protocol (IP) address;
authenticate the server based on a server certificate received from the server via the first connection;
provide the UE identifier to the server, via the first connection, for authentication of the UE; and
provide the initial access token to the server, via the first connection, for authentication of the client.

18. A server configured to operate in an edge data network, the server comprising:
communication interface circuitry configured to communicate with one or more clients for the edge data network; and
processing circuitry operably coupled to the communication interface circuitry, whereby the processing circuitry and the communication interface circuitry are configured to:
establish a first connection with a client of the edge data network based on transport layer security (TLS), wherein:
the client is hosted by a user equipment (UE) that is associated with a UE identifier, and the first connection is associated with an Internet Protocol (IP) address;
provide a server certificate to the client, via the first connection, for authentication of the server;
authenticate the UE based on the UE identifier, which is received from the UE via the first connection; and
authenticate the client based on an initial access token received from the client via the first connection, wherein the initial access token is based on an identifier of the client.

* * * * *